United States Patent
Sundararaj et al.

(10) Patent No.: US 6,610,773 B1
(45) Date of Patent: *Aug. 26, 2003

(54) CONDUCTIVE, LOW WARP POLYETHERIMIDE RESIN COMPOSITIONS

(75) Inventors: Uttandaraman Sundararaj, Montgomery, AL (US); Robert R. Gallucci, Mt. Vernon, IN (US)

(73) Assignee: General Electric Company, Pittsfield, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/208,073

(22) Filed: Dec. 9, 1998

(51) Int. Cl.$^7$ ................................ C08K 3/34
(52) U.S. Cl. ................ 524/449; 524/494; 524/495; 524/508; 524/509; 524/589
(58) Field of Search ............... 524/449, 494, 524/495, 508, 509, 589

(56) References Cited

U.S. PATENT DOCUMENTS

| | | |
|---|---|---|
| 3,803,085 A | 4/1974 | Takehoshi |
| 3,847,867 A | 11/1974 | Heath et al. |
| 3,850,885 A | 11/1974 | Takekoshi et al. |
| 3,852,242 A | 12/1974 | White |
| 3,855,178 A | 12/1974 | White et al. |
| 3,905,942 A | 9/1975 | Takekoshi et al. |
| 3,972,902 A | 8/1976 | Heath et al. |
| 3,983,093 A | 9/1976 | Williams, III et al. |
| 4,404,125 A | 9/1983 | Abolins et al. ............. 252/511 |
| 4,455,410 A | 6/1984 | Giles, Jr. |
| 4,566,990 A | 1/1986 | Liu et al. ..................... 252/503 |
| 4,596,670 A | 6/1986 | Liu ............................ 252/511 |
| 4,600,741 A | 7/1986 | Aycock et al. .............. 524/139 |
| 4,659,760 A | 4/1987 | van der Meer ............. 524/141 |
| 4,929,388 A | 5/1990 | Wessling .................... 252/500 |
| 4,983,093 A | 1/1991 | Foulke et al. ............... 414/416 |
| 5,371,134 A | 12/1994 | Inoue ......................... 524/495 |
| 5,373,039 A | 12/1994 | Sakai et al. ................. 524/100 |
| 5,484,838 A | 1/1996 | Helms et al. ............... 524/496 |
| 5,502,102 A | 3/1996 | Nazareth .................... 524/494 |
| 5,591,382 A | 1/1997 | Nahass et al. .............. 252/511 |

FOREIGN PATENT DOCUMENTS

| | | |
|---|---|---|
| EP | 0 564 660 A | 10/1993 |
| JP | 4342754 | 11/1992 |
| JP | 7242286 | 9/1995 |

*Primary Examiner*—Peter D. Mulcahy

(57) ABSTRACT

Polyetherimide compositions having low warp and conductive properties are provided. The compositions are prepared by combining a polyetherimide resin or polyetherimide-copolymer resin and a filler wherein the filler comprises a plate-like filler and a conductive filler.

27 Claims, No Drawings

CONDUCTIVE, LOW WARP POLYETHERIMIDE RESIN COMPOSITIONS

FIELD OF THE INVENTION

The present invention relates to conductive, low warp polyetherimide resin compositions.

BACKGROUND OF THE INVENTION

Polyetherimide resin compositions have been used to fabricate parts for numerous applications. Each application requires particular tensile and flexural properties, impact strength, heat distortion temperature, and resistance to warp. For example, U.S. Pat. No. 4,455,410 provides a polyetherimide-polyphenylenesulfide blend having good flexural strength characteristics. U.S. Pat. No. 3,983,093 provides polyetherimide compositions having improved solvent resistance and suitable for use in preparing films, molding compounds, coatings, and the like.

When fabricating certain components, a combination of low warp and low surface resistance (i.e., high electrical conductivity) are required. The warp of a given product is dependent upon composition, the geometry of the product and processing conditions such as molding temperature and pressure.

For a material to be useful in computer chip tray applications, the material must provide low warp properties and must possess a surface resisitivity of less than about $10^6$ ohms per square centimeter (ohms/cm$^2$). This is difficult to achieve because the polyetherimide is non-conductive and high levels of conductive materials, such as carbon fiber, added to achieve the desired low surface resistance may contribute to an increase in warp.

There remains a need, therefore, for conductive polyetherimide compositions having low warp and low surface resistance.

SUMMARY OF THE INVENTION

The present invention provides a polyetherimide composition having low warp and conductive properties prepared by combining a polyetherimide resin or polyetherimide-copolymer resin and a filler composition wherein the filler composition comprises a plate-like filler and a conductive filler.

DETAILED DESCRIPTION OF THE INVENTION

The present invention provides a polyetherimide composition having low warp and conductive properties prepared by combining a polyetherimide resin or polyetherimide-copolymer resin and a filler composition wherein the filler composition comprises a plate-like filler and a conductive filler.

The polyetherimide compositions comprise a polyetherimide resin or polyetherimide-copolymer resin and a filler composition comprising a plate-like filler material present in an amount sufficient to impart dimensional stability, in particular, low warp, to the composition and a conductive filler present in an amount sufficient to impart conductive properties to the composition.

Polyetherimide Resins

The polyetherimide resins useful in the compositions of the present invention are known compounds whose preparation and properties are described in U.S. Pat. Nos. 3,803,085 and 3,905,942, each of which is incorporated herein by reference.

Typically, the polyetherimide used for preparing the compositions of this invention comprise about 10 to about 1000 or more, and more preferably about 10 to about 500 structural units, of the formula (I):

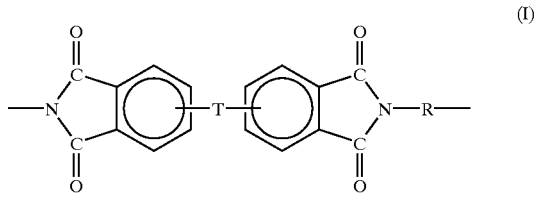

wherein T is —O—, carbonyl, sulfur, sulfoxide or a residue of a bisphenol group of the formula —O—Z—O— wherein the divalent bonds of the —O— or the —O—Z—O— group are in the 3,3', 3,4', 4,3', or the 4,4' positions; Z includes, but is not limited to, a divalent radical of formulae (II):

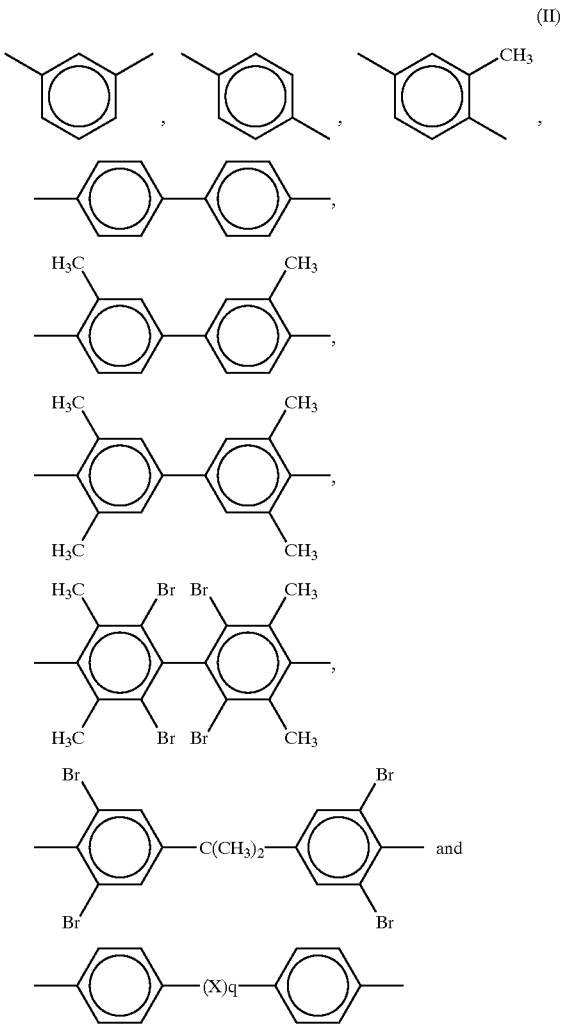

X includes, but is not limited to, divalent radicals of the formulae (III):

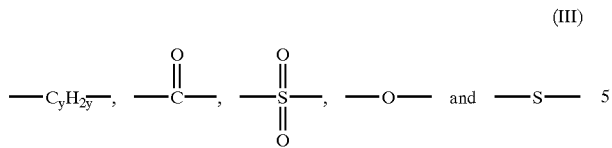 (III)

wherein y is an integer from 1 to about 5, and q is 0 or 1; R includes, but is not limited to, a divalent organic radical: (a) aromatic hydrocarbon radicals having from 6 to about 20 carbon atoms and halogenated derivatives thereof, (b) alkylene radicals having about 2 to about 20 carbon atoms, (c) cycloalkylene radicals having about 3 to about 20 carbon atoms, and (d) divalent radicals of the general formula (IV):

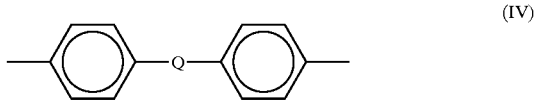 (IV)

where Q includes, but is not limited to, the formulae (V):

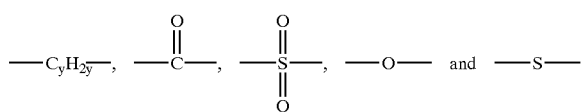 (V)

wherein y is an integer about 1 to about 5.

In one embodiment, the polyetherimide may be a copolymer which, in addition to the etherimide units described above, further contains polyimide structural units of the formula (VI):

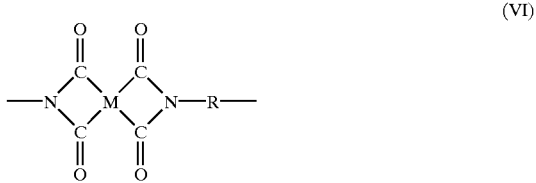 (VI)

wherein R is as previously defined for formula (I) and M includes, but is not limited to, formula (VII):

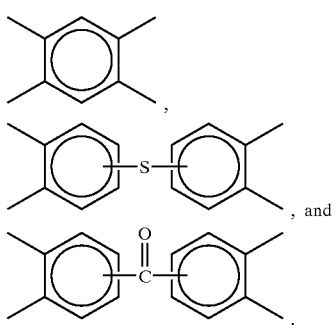 (VII)

The polyetherimide can be prepared by any of the methods well known to those skilled in the art, including the reaction of an aromatic bis(ether anhydride) of the formula (VIII):

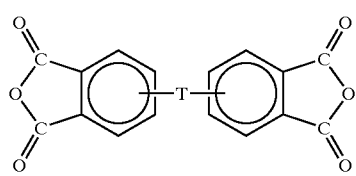 (VIII)

with an organic diamine of the formula (IX):

$$H_2N—R—NH_2 \quad (IX)$$

wherein T and R are defined as described above in formula (I). In general the reactions can be carried out employing well-known solvents, e.g., o-dichlorobenzene, m-cresol/toluene and the like to effect interaction between the anhydride of formula (VIII) and the diamine of formula (IX), at temperatures of about 100° C. to about 250° C.

Alternatively, the polyetherimide can be prepared by melt polymerization of aromatic bis(ether anhydrides) and diamines accomplished by heating a mixture of the ingredients to elevated temperatures with concurrent stirring. Generally melt polymerizations employ temperatures of about 200° C. to about 400° C. Chain stoppers and branching agents may also be employed in the reaction.

Examples of specific aromatic bis(ether anhydrides) and organic diamines are disclosed, for example, in U.S. Pat. Nos. 3,972,902 and 4,455,410, which are incorporated herein by reference.

Illustrative examples of aromatic bis(etheranhydride)s of formula (VIII) include: 2,2-bis[4-(3,4-dicarboxyphenoxy) phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis [4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride and 4-(2,3-dicarboxyphenoxy)-4'-(3,4-dicarboxyphenoxy)diphenyl sulfone dianhydride, as well as various mixtures thereof.

A preferred class of aromatic bis(etheranhydride)s included by formula (VIII) above includes, but is not limited to, compounds wherein T is of the formula (X):

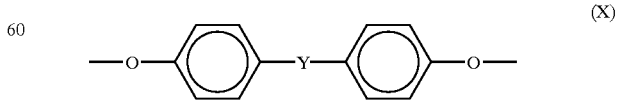 (X)

and the ether linkages, for example, are preferably in the 3,3', 3,4', 4,3', or 4,4' positions, and mixtures thereof, and where Y includes, but is not limited to the formulae (XI):

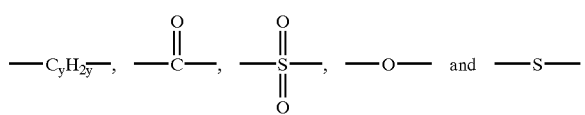
(XI)

When polyetherimide/polyimide copolymers are employed, a dianhydride, such as pyromellitic dianhydride, is used in combination with the bis(ether anhydride).

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent.

Suitable organic diamines of formula (IX) include, for example: m-phenylenediamine; p-phenylenediamine; 4,4'-diaminodiphenylpropane, 4,4'-diaminodiphenylmethane (commonly named 4,4'-methylenedianiline); 4,4'-diaminodiphenyl sulfide; 4,4'-diaminodiphenyl sulfone; 4,4'-diaminodiphenyl ether (commonly named 4,4'-oxydianiline); 1,5-diaminonaphthalene; 3,3-dimethylbenzidine; 3,3-dimethoxybenzidine; 2,4-bis(beta-amino-t-butyl)toluene; bis(p-beta-amino-t-butylphenyl) ether; bis(p-beta-methyl-o-aminophenyl)benzene; 1,3-diamino-4-isopropylbenzene; 1,2-bis(3-aminopropoxy)ethane; benzidine; m-xylylenediamine; 2,4-diaminotoluene; 2,6-diaminotoluene; bis(4-aminocyclohexyl)methane; 3-methylheptamethylenediamine; 4,4-dimethylheptamethylenediamine; 2,11-dodecanediamine; 2,2-dimethylpropylenediamine; 1,18-octamethylenediamine; 3-methoxyhexamethylenediamine; 2,5-dimethylhexamethylenediamine; 2,5-dimethylheptamethylenediamine; 3-methylheptamethylenediamine; 5-methylnonamethylenediamine; 1-4-cyclohexanediamine; 1,18-octadecanediamine; bis(3-aminopropyl)sulfide; N-methyl-bis(3-aminopropyl)amine; hexamethylenediamine; heptamethylenediamine; nonamethylenediamine; decamethylenediamine and mixtures of such diamines.

Generally, useful polyetherimides have a melt index of between 0.1 and 10 grams per minute ("g/min"), as measured by American Society for Testing Materials ("ASTM") D1238 at 295° C., using a 6.6 kilogram ("kg") weight.

In a preferred embodiment, the polyetherimide resin of the present invention has a weight average molecular weight of from 10,000 to 150,000 grams per mole ("g/mole"), as measured by gel permeation chromatography, using a polystyrene standard. Such polyetherimide resins typically have an intrinsic viscosity [η] greater than about 0.2 deciliters per gram, preferably about 0.35 to about 0.7 deciliters per gram measured in m-cresol at 25° C.

In a preferred embodiment, the polyetherimide resin comprises structural units according to formula (I) wherein each R is independently paraphenylene or metaphenylene and T is a divalent radical of the formula (XII):

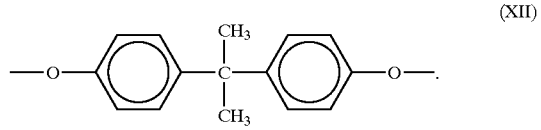
(XII)

Polyetherimide and polyetherimide-copolymers are suitable for the present invention, such as those disclosed in U.S. Pat. No. 3,983,093, commonly assigned, which is hereby incorporated herein in its entirety. Particularly preferred for compositions of the present invention are polyetherimide-pyromellitic dianhydride copolymer resins and polyetherimide resins available from General Electric. The polyetherimide resins and copolymers of this invention can be further blended with other high temperature thermoplastics. Especially preferred are other amorphous high glass transition temperature polymers such as polycarbonates, polyarylates, polyester carbonates, polysulfones, polyether sulfones, and polyphenylene ethers.

Plate-like Filler

The plate-like filler may be any plate-like filler selected to impart dimensional stability, and in particular low warp characteristics, to the composition, such as mica or flaked glass. Preferable mica fillers are the naturally occurring mica fillers such as phlogophite mica of the formula (XIII):

$KAl_2(AlSi_3O_{10})(OH)_2$ (XIII)

and muscovite mica of the formula (XIV):

$KMg_3(AlSi_3O_{10})(OH)_2$ (XIV).

A preferred plate-like flaked glass filler is borosilicate E glass.

The particle size of the plate-like filler may range from a maximum dimension of from 5 to about 1000 microns, with about 20 to about 300 microns most preferred. The thickness of the plate-like filler is about 0.5 to about 300 microns.

The plate-like fillers of the present invention may be treated to enhance performance as dimensional stabilizers. Suitable surface treatment agents include functionalized silanes such as amino, mercapto, or epoxy functionalized alkoxy silanes. Gamma-aminopropyltriethoxysilane is particularly preferred as a surface treatment agent.

The plate-like filler and conductive filler are employed in relative amounts sufficient to impart the desired combination of low warp and low surface resistivity to the composition. Preferably, the plate-like filler comprises about 1% to about 50% by weight based upon the total weight of the composition. More preferably, the plate-like filler comprises about 5% to about 30% by weight based on the total weight of the composition. Most preferably, the plate-like filler comprises about 10% to about 20% by weight based on the total weight of the composition.

Conductive Filler

The conductive filler may comprise any electrically conductive material capable of imparting sufficient electrical conductivity to the polyetherimide composition and which is compatible with polyetherimide. Suitable conductive materials include, but are not limited to, carbon fibers, carbon fibrils, conductive carbon powder, metal fibers, metal coated carbon fibers, especially nickel coated carbon fibers, metal flake, metal powder, or mixtures thereof and others, with materials exhibiting surface resistivities below about $10^6$ ohms/$cm^2$ preferred. Most preferably, the conductive filler is a fibrous conductive filler such as carbon fiber, preferably having a diameter of about 1 to about 20 microns.

The conductive filler material can be surface treated, preferably with a polyetherimide coating, to enhance performance.

In a preferred embodiment, the conductive filler comprises about 9% to about 45% by weight of the total weight of the composition. In a most preferred embodiment, the conductive filler material comprises about 9% to about 15% by weight of the total weight of the composition.

Other additives

Additionally, the thermoplastic resin composition of the present invention may optionally also contain various additives, such as antioxidants, such as, for example, organophosphites, for example, tris(nonyl-phenyl) phosphite, tris(2,4-di-t-butylphenyl)phosphite, bis(2,4-di-t-butylphenyl)pentaerythritol diphosphite or distearyl pentaerythritol diphosphite, alkylated monophenols, polyphenols and alkylated reaction products of polyphenols with dienes, such as, for example, tetra-cis(methylene)-3,5-di-t-butyl-4-hydroxycinnamate, butylated reaction products of para-cresol and dicyclopentadiene, alkylated hydroquinones, hydroxylated thiodiphenyl ethers, alkylidene-bisphenols, benzyl compounds, acylaminophenols, esters of beta-(3,5-di-tert-butyl-4-hydroxyphenol)-propionic acid with monohydric or polyhydric alcohols, esters of beta-(5-tert-butyl-4-hydroxy-3-methylphenyl)-propionic acid with monohydric or polyhydric alcohols, esters of beta-(5-tert-butyl-4-hydroxy-3-methylphenyl) propionic acid with mono-or polyhydric alcohols, esters of thioalkyl or thioaryl compounds, such as, for example, distearylthiopropionate, dilaurylthiopropionate, ditridecylthiodipropionate, and amides of beta-(3,5-di-tert-butyl-4-hydroxyphenol)-propionic acid.

Other optional additives include mold release agents, UV absorbers, stabilizers such as light stabilizers, lubricants, plasticizers, pigments, dyes, colorants, blowing agents, and flame retardants, among others. The preferred lubricants (i.e., mold release agents) for these compositions are polyolefin materials such as polyethylene. As a mold release/processing aid, the polyolefin can be added at about 0.1% to about 5% by weight, preferably about 0.2% to about 1% by weight based on the total weight of the composition.

The total amount of all filler, including plate-like filler, conductive filler, and any other additives, present in the inventive composition is preferably about 50% and most preferably about 15% to about 30% by weight based on the total weight of the composition.

The compositions of the present invention exhibit a surface resistance of less than about $10^6$ ohms/cm$^2$, preferably less than about $10^4$ ohms/cm$^2$, and most preferably less than about $10^3$ ohms/cm$^2$. While the compositions of the present invention have application in a wide variety of physical shapes and forms, including use as films, molding compounds, and the like, the surface resistivities achieved render the compositions particularly useful as electrostatic discharge materials for fabricating components such as computer chip trays.

The compositions of the present invention possess good dimensional stability, i.e., exhibit low warp. While warp will partially depend on the geometry of the part and material processing, parts produced with the compositions of the present invention will exhibit less warp than parts produced with resin compositions comprising only conductive filler or resin compositions comprising a blend of conductive filler with a non-platelike filler. An edge-gated 4 inch by 1/16 inch disk, for example, would exhibit a warp on molding of about 0 millimeters (mm) to about 8 mm.

Included among the many methods of making the polyetherimide are those disclosed in U.S. Pat. Nos. 3,847,867, 3,850,885, 3,852,242, 3,855,178, and 3,983,093. These patents are incorporated herein by reference for the purpose of teaching, by way of illustration, general and specific methods for preparing polyetherimide for use in the compositions of this invention.

The preparation of the compositions of the present invention is normally achieved by blending the ingredients under conditions for the formation of an intimate blend. Such conditions often include solution blending or melt mixing in single or twin screw type extruders, mixing bowl, roll, kneader, or similar mixing devices that can apply a shear to the components. Twin screw extruders are often preferred due to their more intensive mixing capability over single screw extruders. However, severe compounding or mixing conditions should be avoided as such processing can break the plate-like filler and conductive filler down resulting in reduced performance. It is often advantageous to apply a vacuum to the blend through at least one vent port in the extruder to remove volatile impurities in the composition.

Examples 1–9 were prepared as set forth in Table 1, in order to illustrate specific polyetherimide resin compositions comprising plate-like filler and conductive filler in accordance with the present invention. Comparative Examples A–H were prepared as set forth in Table 2. It should be understood that the examples and comparative examples are given for the purpose of illustration and do not limit the invention. In the examples and comparative examples, all parts and percentages are by weight.

Computer chip trays and disk-shaped sample parts were prepared from the compositions of the present invention (Examples 1–9) and from comparative compositions (Examples A–H). Processing conditions were as set forth in the Tables. After forming the compositions into computer chip trays or sample disks, warp on molding and warp on annealing was determined Warp on molding and warp on annealing was measured using a "warp test," which is performed by placing a sample on a flat surface and measuring the maximum height of the bottom surface both after molding and after annealing. Surface resistivity was determined using ASTM Test Method D157 using the 803B Surface Resistivity meter commercially available from ETS Corporation.

TABLE 1

| Sample number | 1 | 2 | 3 | 4 | 5 | 6 | 7 | 8 | 9 |
|---|---|---|---|---|---|---|---|---|---|
| CF1[1] (wt %) | 10 | 10 | 10 | 10 | 10 | 10 | — | — | — |
| CF2[2] (wt %) | — | — | — | — | — | — | 12 | 12 | 10 |
| Mica 1[3] (wt %) | 8 | 12 | 8 | 12 | 16 | 20 | 16 | 20 | 20 |
| Mica 2[4] (wt %) | — | — | — | — | — | — | — | — | — |
| U1000[5] (wt %) | — | — | — | — | — | — | 71.8 | 67.8 | 69.8 |
| U6010[6] (wt %) | 82 | 77.8 | 81.8 | 77.8 | 73.8 | 69.8 | — | — | — |
| Mold Release (PE)[7] (wt %) | — | 0.2 | 0.2 | 0.2 | 0.2 | 0.2 | 0.2 | 0.2 | 0.2 |
| Warp on molding[8,9] | 0.020 in | 0.017 in | 11.6 mm | 6.0 mm | 4.4 mm | 0.5 mm | 0 mm | 0 mm | 0 mm |
| Annealed Warp[8,9] | 0.025 in | 0.023 in | 7.4 mm | 4.8 mm | 5.0 mm | 1.0 mm | 7.4 mm | 3.8 mm | 3.3 mm |

TABLE 1-continued

| Sample number | 1 | 2 | 3 | 4 | 5 | 6 | 7 | 8 | 9 |
|---|---|---|---|---|---|---|---|---|---|
| Part type | Chip Tray | Chip Tray | 1/16 inch disk | 1/16 inch disk | 1/16 inch disk | 1/16 inch disk | 1/16 inch disk | 1/16 inch disk | 1/16 inch disk |
| Surface Resistivity (ohm/sq cm) | $1.5 \times 10^5$ | $7 \times 10^4$ | $1.6 \times 10^5$ | $5 \times 10^4$ | $9 \times 10^4$ | $7 \times 10^4$ | $7.1 \times 10^2$ | $1.0 \times 10^5$ | $1.0 \times 10^5$ |

[1] Polyetherimide-coated carbon fiber available from Akzo; Diameter 7 micron; length 1/8 inch.
[2] Carbon Fiber coated with water-based coating available from Akzo; Diameter 7 micron; length 1/8-inch.
[3] Mica 1 = phlogophite available from Suzorite Corporation as 150S.
[4] Mica 2 = phlogophite available from Suzorite Corporation as 150 NY.
[5] Polyetherimide-pyromellitic dianhydride copolymer available from General Electric.
[6] Polyetherimide polymer available from General Electric.
[7] PE = polyethylene
[8,9] Molding condition for chip tray is 740° F.; 600 psi hold pressure, 30 s cycle time, mold temp 400° F.
[8,9] Std. Molding condition for 1/16 inch × 4 inch disk is 750° F.; 500 psi hold pressure, 20 s cycle time, mold temp 350° F.

TABLE 2

| Sample number | A | B | C | D | E | F | G | H |
|---|---|---|---|---|---|---|---|---|
| CF[1] (wt %) | 10 | — | — | — | — | — | — | — |
| CF2[2] (wt %) | — | — | — | — | 8 | 12 | 8 | 8 |
| Mica[3] (wt %) | — | 12 | — | 12 | — | — | 16 | 20 |
| Mica[4] (wt %) | — | — | 12 | — | — | — | — | — |
| U1000[5] (wt %) | — | — | — | — | 92 | 90 | 75.8 | 71.8 |
| U6010[6] (wt %) | 90 | 88 | 88 | 87.8 | — | — | — | — |
| Mold Release[7] (PE) (wt %) | — | — | — | 0.2 | — | — | 0.2 | 0.2 |
| Warp on molding[8,9] | 0.020 in | 0.012 in/0 mm | 0 mm | 0 mm | 0.2 mm | 0 mm | 0 mm | 0 mm |
| Annealed Warp[8,9] | 0.042 in | 0.015/0 mm in | 2 mm | 0.4 mm | 6.6 mm | 9.6 mm | 3.5 mm | 2.6 mm |
| Part type | Chip Tray | Chip Tray 1/16 inch disk | 1/16 inch disk | 1/16 inch disk | 1/16 inch disk | 1/16 inch disk | 1/16 inch disk | 1/16 inch disk |
| Surface Resistivity (ohm/sq cm) | $1.8 \times 10^5$ | $9.1 \times 10^{11}$ | $10^{12}$ | $10^{12}$ | $8.4 \times 10^{11}$ | $1.6 \times 10^5$ | $1.0 \times 10^{12}$ | $1.0 \times 10^{12}$ |

[1] Polyetherimide-coated carbon fiber available from Akzo; Diameter 7 micron; length 1/8 inch.
[2] Carbon Fiber coated with water-based coating available from Akzo; Diameter 7 micron; length 1/8 inch.
[3] Mica 1 = phlogophite available from Suzorite Corporation as 150S.
[4] Mica 2 = phlogophite available from Suzorite Corporation as 150 NY.
[5] Polyetherimide-pyromellitic dianhydride copolymer available from General Electric.
[6] Polyetherimide polymer available from General Electric.
[7] PE = polyethylene
[8,9] Molding condition for chip tray is 740° F.; 600 psi hold pressure, 30 s cycle time, mold temp 400° F.
[8,9] Molding condition for 1/16 inch × 4 inch disk is 750° F.; 500 psi hold pressure, 20 s cycle time, mold temp 350° F.

The results in Tables 1 and 2 show that disk-shaped parts formed with the polyetherimide-pyromellitic dianhydride copolymer compositions of the present invention comprising about 20% mica filler and about 10% carbon fiber filler had the minimum (undetectable) warp on molding and the minimum warp on annealing at temperatures of 350° F., as illustrated in Examples 7, 8, and 9, with surface resistivities of less than $10^6$ ohms/cm$^2$.

In contrast, disk-shaped parts formed with compositions that were outside the scope of the present invention did not possess the advantageous combination of low warp and conductive (i.e., low surface resistivity) properties obtained with the compositions of the present invention. As shown in Comparative Example H, a disk-shape part was formed from a polyetherimide-pyromellitic dianhydride copolymer composition comprising about 20% mica filler with about 8% carbon fiber filler. The part prepared with the composition of Comparative Example H exhibited adequate warp properties but provided a surface resistivity of $10^{12}$ ohms/cm$^2$, which does not provide a conductivity suitable for many applications.

The results further show that computer chip trays formed from the compositions of the present invention, Examples 1 and 2, provided a combination of low warp and conductive properties not achieved with computer chip trays formed from compositions outside the scope of the present invention, as shown in Comparative Examples A and B.

The present inventors have shown that conductive filler and plate-like filler have significant effects on warp. Increasing the amount of conductive filler increases warp while increasing the amount of plate-like filler material decreases warp. At the same time, however, a minimum amount of conductive filler material is necessary to impart the desired electrical conductivity to the compositions. The polyetherimide and polyetherimide-copolymer compositions of the present invention provide a balance of low warp and low surface resistivity that render the compositions useful for applications requiring both dimensional stability and conductivity. Compositions of the present invention are particularly suitable for forming computer chip trays and printed circuit board carriers, which much be dimensionally stable (i.e., exhibit low warp) and provide a surface resisitivy of less than about $10^6$ ohms/cm$^2$.

We claim:

1. A polyetherimide composition, comprising a polyetherimide resin or polyetherimide-copolymer resin;

mica, flaked glass, or a mixture thereof present in an amount of about 5% to about 30% by weight based on the total weight of the composition; and conductive filler consisting of carbon fiber present in an amount of about 9% to about 45% by weight of based on the total weight of the composition wherein the composition has low warp properties and a surface resistivity of less than or equal to about $10^6$ ohms/cm$^2$ in the absence of metal flake and polyphenylene sulfide.

2. The composition of claim 1, wherein said surface resistivity is about $10^3$ to about $10^6$ ohms/cm$^2$.

3. The composition of claim 1, wherein said mica is phlogophite mica, muscovite mica, or a mixture thereof.

4. The composition of claim 1, wherein said flaked glass is borosilicate E glass.

5. The composition of claim 1, wherein said mica, flaked glass, or a mixture thereof has a maximum dimension in the range of about 20 to about 300 microns.

6. The composition of claim 1, wherein said mica, flaked glass, or a mixture thereof is present in an amount of about 10 to about 20% by weight based on the total weight of the composition; and said carbon fiber is present in an amount of about 9 to about 15% by weight based on the total weight of the composition.

7. The composition of claim 1, wherein said mica, flaked glass, or a mixture thereof and carbon fiber is present in an amount of about 1 to about 50% by weight based on the total weight of the composition.

8. The composition of claim 7, wherein said mica, flaked glass, or a mixture thereof and carbon fiber is present in an amount of about 15% to about 30% by weight based on the total weight of the composition.

9. The composition of claim 1, wherein said carbon fiber is coated with polyetherimide resin or polyetherimide copolymer resin.

10. The composition of claim 1, wherein said carbon fiber has a diameter in the range of about 1 to about 20 microns.

11. A computer chip tray comprising the polyetherimide composition of claim 1.

12. The computer chip tray of claim 11, wherein said mica, flaked glass, or a mixture thereof is present in an amount of about 5 to about 30% by weight; and said carbon fiber is present in an amount of about 9 to about 40% by weight.

13. The computer chip tray of claim 12, wherein said mica, flaked glass, or a mixture thereof and carbon fiber is present in an amount of about 1 to about 50% by weight based on the total weight of the composition.

14. The computer chip tray of claim 13, wherein said mica, flaked glass, or a mixture thereof and carbon fiber is present in an amount of about 15% to about 30% by weight based on the total weight of the composition.

15. The composition of claim 1, wherein said polyetherimide resin is of the formula

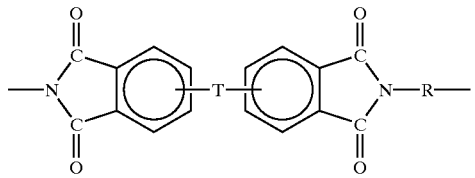

where T is selected from the group consisting of oxygen, carbonyl, sulfur, sulfoxide, and bisphenol residue, and R is selected from the group consisting of aromatic hydrocarbon radicals having from 6 to 20 carbon atoms and halogenated derivatives thereof.

16. The composition of claim 15, wherein said bisphenol residue is derived form bisphenol A and R is phenyl.

17. The composition of claim 1, further comprising a polyolefin.

18. The composition of claim 17, wherein said polyolefin is polyethylene.

19. The composition of claim 18, wherein said polyethylene is present in an amount of about 0.1% to about 5% by weight based on the total weight of the composition.

20. A polyetherimide composition, consisting of a polyetherimide resin or polyetherimide-copolymer resin;

mica, flaked glass, or a mixture thereof present in an amount of about 5% to about 30% by weight of based on the total weight of the composition; and carbon fiber or carbon fibrils present in an amount of about 9% to about 45% by weight of based on the total weight of the composition wherein the composition has a surface resistivity of less than or equal to about $10^6$ ohms/cm$^2$ and low warp properties.

21. The composition of claim 1, wherein said mica, flaked glass, or a mixture thereof is present in an amount of about 10 to about 20% by weight based on the total weight of the composition; and said carbon fiber or carbon fibrils is present in an amount of about 9 to about 15% by weight based on the total weight of the composition.

22. A computer chip tray comprising the polyetherimide composition of claim 20.

23. The computer chip tray of claim 22, wherein said mica, flaked glass, or a mixture thereof and carbon fiber or carbon fibril is present in an amount of about 1 to about 50% by weight based on the total weight of the composition.

24. The computer chip tray of claim 22, wherein said mica, flaked glass, or a mixture thereof and carbon fiber or carbon fibril is present in an amount of about 15% to about 30% by weight based on the total weight of the composition.

25. A polyetherimide composition, consisting of
a polyetherimide resin or polyetherimide-copolymer resin;
mica, flaked glass, or a mixture thereof present in an amount of about 5% to about 30% by weight of based on the total weight of the composition;
carbon fiber or carbon fibrils present in an amount of about 9% to about 45% by weight of based on the total weight of the composition; and
a polyolefin wherein the composition has a surface resistivity of less than or equal to about $10^6$ ohms/cm$^2$ and low warp properties.

26. The composition of claim 25, wherein said polyolefin is polyethylene.

27. A computer chip tray comprising the polyetherimide composition of claim 25.

* * * * *